United States Patent
Liu et al.

(10) Patent No.: US 7,920,591 B2
(45) Date of Patent: Apr. 5, 2011

(54) DEVICE AND METHOD FOR IMPLENTING DYNAMIC ADJUSTMENTING BANDWIDTH OF DATA IN A TRANSMISSION DEVICE

(75) Inventors: Qingliang Liu, Shenzhen (CN); Chang Zhou, Shenzhen (CN); Rong Liu, Shenzhen (CN)

(73) Assignee: ZTE Corporation, Shenzen, Guangdong Province (CN)

( * ) Notice: Subject to any disclaimer, the term of this patent is extended or adjusted under 35 U.S.C. 154(b) by 1103 days.

(21) Appl. No.: 10/565,468

(22) PCT Filed: Dec. 2, 2003

(86) PCT No.: PCT/CN03/01032
§ 371 (c)(1),
(2), (4) Date: Jan. 19, 2006

(87) PCT Pub. No.: WO2005/008958
PCT Pub. Date: Jan. 27, 2005

(65) Prior Publication Data
US 2006/0176905 A1    Aug. 10, 2006

(30) Foreign Application Priority Data
Jul. 21, 2003   (CN) .................................. 03 1 39945

(51) Int. Cl.
*H04J 3/16*   (2006.01)
*H04J 3/22*   (2006.01)
(52) U.S. Cl. ........................................ 370/468; 370/410
(58) Field of Classification Search .................. 370/468, 370/230, 465, 252, 395.4, 349, 350, 352, 370/410; 709/224; 725/95, 116
See application file for complete search history.

(56) References Cited

U.S. PATENT DOCUMENTS
5,313,461 A    5/1994   Ahl et al.
(Continued)

FOREIGN PATENT DOCUMENTS
CN    1138259 A    5/1996
(Continued)

OTHER PUBLICATIONS
Fan Yaxi et al, "Design and FPGA Implementation of Ethernet over Multiple E1 Links", Application of Electronic Techniques, vol. II, 2002, pp. 72-74.
(Continued)

*Primary Examiner* — Brian D Nguyen
(74) *Attorney, Agent, or Firm* — Thomas, Kayden, Horstemeyer & Risley, LLP

(57) ABSTRACT

A method and a device for realizing dynamic adjustment of data bandwidth of the invention are disclosed. The method comprises adding a control channel in a PCM trunk link to describe occupancy condition of time slots for current services. The device comprises a control word process circuit, a time slot distribution circuit and a CPU interface circuit, wherein the control word process circuit is designed to complete abstraction and insertion of control information in a control channel of E1/T1 link, the time slot distribution circuit completes separating voice time slots from Ethernet data time slots and rebuilding the data, and the CPU interface circuit implements time slot distribution control. The method and the device can implement dynamic adjustment of Ethernet data bandwidth while ensuring voice services, to make effective use of trunk bandwidth and enhance user's data service bandwidth, without error code and interruption of data service during bandwidth adjustment.

9 Claims, 3 Drawing Sheets

U.S. PATENT DOCUMENTS

| | | | |
|---|---|---|---|
| 5,625,629 A * | 4/1997 | Wenk | 370/347 |
| 6,438,115 B1 * | 8/2002 | Mazur et al. | 370/330 |
| 6,657,970 B1 * | 12/2003 | Buckingham et al. | 370/249 |
| 7,031,341 B2 * | 4/2006 | Yu | 370/469 |
| 7,190,676 B2 * | 3/2007 | Anderson, Sr. | 370/236 |
| 2001/0017849 A1 * | 8/2001 | Campanella et al. | 370/326 |
| 2002/0054597 A1 * | 5/2002 | O'Toole et al. | 370/395.41 |
| 2003/0039244 A1 * | 2/2003 | Owens et al. | 370/389 |
| 2003/0065823 A1 * | 4/2003 | Kim | 709/250 |
| 2003/0067928 A1 * | 4/2003 | Gonda | 370/401 |
| 2003/0072295 A1 * | 4/2003 | Maxemchuk | 370/348 |
| 2003/0123472 A1 * | 7/2003 | Dufour et al. | 370/442 |
| 2003/0179707 A1 * | 9/2003 | Bare | 370/235 |
| 2003/0198189 A1 * | 10/2003 | Roberts et al. | 370/252 |
| 2004/0001579 A1 * | 1/2004 | Feinberg et al. | 379/156 |
| 2004/0008642 A1 * | 1/2004 | Marko et al. | 370/321 |
| 2004/0049389 A1 * | 3/2004 | Marko et al. | 704/260 |
| 2006/0176905 A1 * | 8/2006 | Liu et al. | 370/468 |

FOREIGN PATENT DOCUMENTS

| | | |
|---|---|---|
| CN | 1400790 A | 7/2001 |
| DE | 101 04 918 A1 | 2/2001 |
| DE | 10104918 A1 | 11/2001 |
| EP | 0 428 407 A | 5/1991 |
| WO | WO 96/38966 | 12/1996 |
| WO | WO 00/54533 | 9/2000 |

OTHER PUBLICATIONS

Chen et al, "Performance Analysis of Two Ethernet over E1 Schemes", Tsinghua Science and Technology, ISSN 1007-0214 11/17, vol. 12, No. 1, Feb. 2007, pp. 70-76.

Office Actions issued by European Patent Office and Russian Patent Office for corresponding applications based on PCT/CN2003/001032.

* cited by examiner

DEVICE AND METHOD FOR IMPLENTING DYNAMIC ADJUSTMENTING BANDWIDTH OF DATA IN A TRANSMISSION DEVICE

CROSS-REFERENCE TO RELATED APPLICATIONS

This application is a national stage application of International Application No. PCT/CN2003/001032, filed Dec. 2, 2003, which claims priority to Chinese Patent Application No. 03139945.2, filed Jul. 21, 2003, both applications of which are hereby incorporated by reference in their entirety into the present application.

FIELD OF THE INVENTION

The present invention relates to Ethernet communication technology, and more particularly to a device and method for realizing dynamic adjustment of data bandwidth in a transmission device.

BACKGROUND OF THE INVENTION

Pulse Code Modulation (PCM), as a traditional concept, means multiplexing voice service to E1/T1 by PCM. With its development, particularly for demand for data services, the PCM device is enhanced in its capability to support service. Now the concept of PCM is limited to multiplexing voice, but can handle multiple services such as voice, data, image, etc. to E1/T1 on the basis of time slot, as shown in FIG. 1. At the beginning, multiplexing of data and image services is realized through a V.35 interface, and the device only simply maps the V.35 channel to a time slot of E1/T1. It generally needs an outside protocol converter or Router for realizing the data service application with the V.35 interface. Nowadays, for more conveniently and simply realizing access of data services for users, PCM equipment can supply a 10M Ethernet interface to realize seamless access of user data.

PCM devices have been widely used in telecommunication and special networks, such as electric power, water conservancy and public security, because of its simple technology, flexible application and reasonable price. However, in networking applications with limited bandwidth, especially special networks, it is generally required to sufficiently utilize the trunk bandwidth because rental trunk bandwidth is limited. Particularly, when voice and data access are mixed, it is required that data services can occupy idle time slots while voice is not activated. However, service bandwidth is generally configured in a static state for a PCM device, and the bandwidth of data service is distributed to fixed time slots. Even if voice service is free, data service cannot occupy the idle bandwidth. If software is used to reconfigure the number of time slots for data service by detecting idle time slots, it will result in butting problems with opposing equipment and error codes in data services, and even service interruption caused by changing bandwidth.

SUMMARY OF THE INVENTION

An object of the present invention is to provide a device, which can realize a dynamic adjustment of bandwidth in transmission equipment, in order to dynamically adjust Ethernet data bandwidth and effectively use repeater bandwidth resources.

Another object of the present invention is to provide a method for realizing dynamic adjustment of data bandwidth to dynamically adjust Ethernet data bandwidth and effectively use trunk bandwidth resources, especially, to realize dynamic bandwidth adjustment for Ethernet data in the intelligent integration of a PCM device in a communication domain while ensuring voice services.

The method for realizing dynamic adjustment of Ethernet bandwidth in a PCM device according to the present invention comprises adding a control channel on a PCM trunk link to describe the time slot occupancy condition of the current services (voice, Ethernet data, etc.). Application in peer networking is required for realizing this method in order to realize correct demultiplexing and multiplexing for different services.

The difference between the present invention and a traditional PCM voice and data system is to offer a channel distribution mechanism. The mechanism, under the control of a CPU, completes dynamic distribution of time slots on a PCM line. It mainly comprises circuit configurations for control word retrieving and insertion, time slot distribution and CPU interface.

Time slot distribution is controlled by channel control words written in a control channel, and the control channel may comprise one or more time slots; however, one time slot is recommended to save occupancy of the control channel in trunk data bandwidth.

Particularly, the present invention provides a method for realizing dynamic adjustment of data bandwidth in transmission equipment, in which a control channel is added in a trunk link in the transmission equipment to describe the time slot occupancy condition.

The control channel completes time slot dynamic distribution for the PCM line under the control of the CPU.

The time slot dynamic distribution is controlled by channel control words written in the control channel, and the control channel may comprise one or more time slots.

The current services include voice service, and Ethernet data service.

The method is applied in peer networking to realize correct demultiplexing and multiplexing of the different services.

The present invention also provides a device for realizing dynamic adjustment of data bandwidth in transmission equipment, which comprises: a control word process circuit, a time slot distribution circuit and a CPU interface circuit, wherein the control word process circuit is designed to complete extraction and insertion of control information in control channel of E1/T1 link; the time slot distribution circuit completes separating voice time slots from Ethernet data time slots, and rebuilding data; the CPU interface circuit is for implementing control of the time slot distribution.

The device also includes High Level Data Link Control (HDLC)/Media Access Control (MAC) frame process circuit to implement processing an HDLC link for Ethernet data, checking integrity of the MAC frame, and comparing and learning MAC addresses.

The time slot dynamic distribution circuit is controlled by the channel control words written in the control channel, and the control channel may comprise one or multiple time slots.

The present invention also provides a method for realizing dynamic adjustment of data bandwidth in transmission equipment, characterized in that, when a current service is multiplexed in a direction of the E1/T1 link, CPU informs the time slot distribution circuit of the time slot numbers to be occupied by the voice service according to a voice call condition, and the time slot distribution circuit releases the time slots from the Ethernet data service, and distributes them to the voice service; after the voice call is finished, the CPU informs the time slot distribution circuit that the time slots have been released by the voice service, and time slot distribution circuit assigns the time slots to the Ethernet data service, thereby dynamic adjustment of the Ethernet data service can be implemented.

The application of the present invention, compared with the prior art, can implement dynamic adjustment of the Ethernet data bandwidth while ensuring the voice services, and it reaches sufficient and effective usage of the E1/T1 trunk bandwidth without error codes and interruption of data service during bandwidth adjustment, so that a user's data service bandwidth is enhanced.

DETAILED DESCRIPTION OF THE INVENTION

Figure 3:
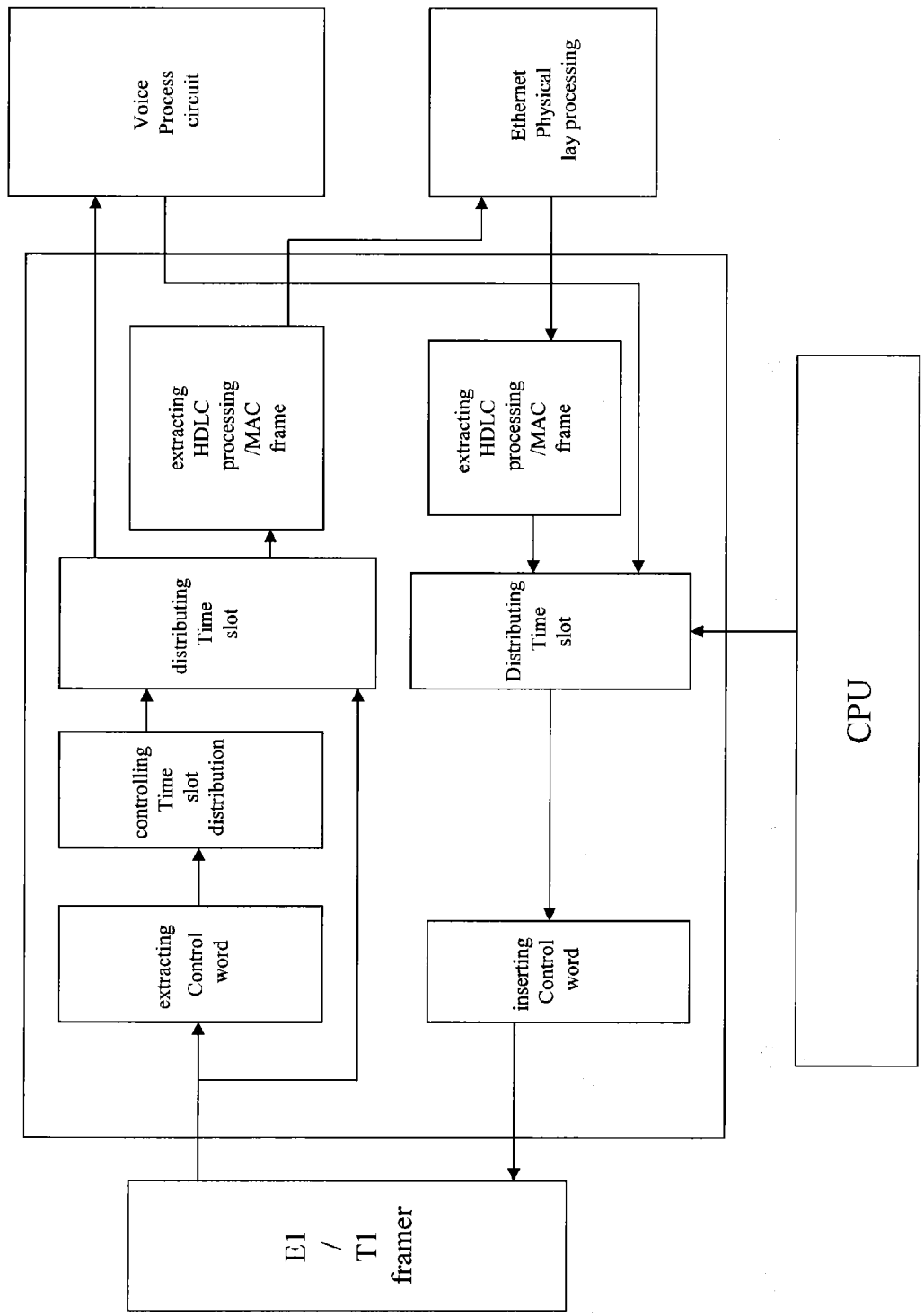
FIG. 3 is a hardware schematic diagram of the present invention.

In accordance with attached figures, embodiments of the technical solutions will be further described in details as follows:

A hardware portion (FIG. 3) of the present invention comprises a control word process circuit, a time slot distribution circuit, a High Level Data Link Control (HDLC)/Media Access Control (MAC) frame process circuit and a CPU interface circuit. The control word process circuit implements extraction and insertion of control information in the control channel of an E1/T1 link, and the time slot distribution circuit implements separating voice time slots from Ethernet data time slots and rebuilding Ethernet data, and the HDLC/MAC frame process circuit implements processing the HDLC link for Ethernet data, checking integrity of the MAC frame, and comparing and learning MAC addresses. The CPU interface circuit implements time slot distribution control. Since circuit schematic diagrams in the present invention are known to those skilled in the art, they will not be further described here.

Figure 1:
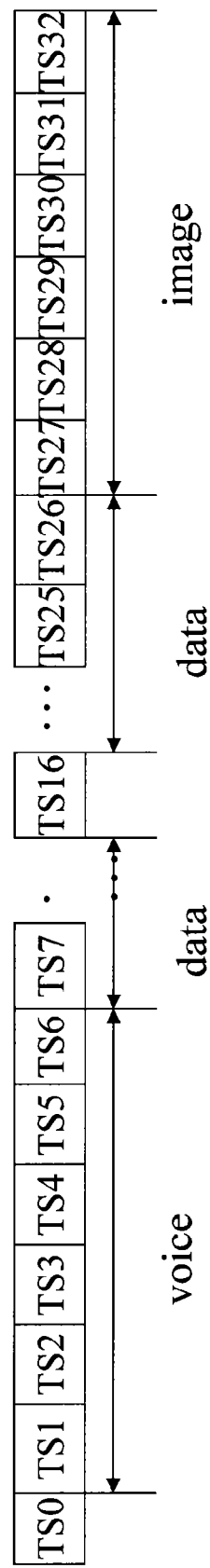
FIG. 1 is a schematic graph of integrated services multiplexed to an E1/T1 line.

A control channel is defined to be located in time slot 1 (FIG. 1) of E1/T1 link (time slot 0 is used as frame synchronization of the link).

Figure 2:
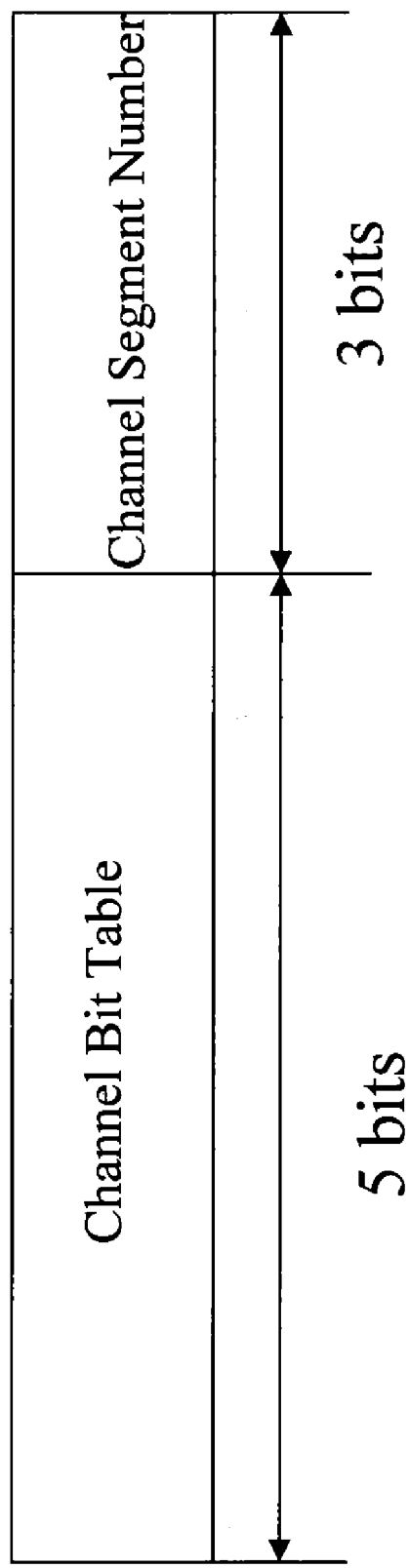
FIG. 2 shows bit definitions of a control channel.

Bit definition of the control channel is shown as FIG. 2.

A Time slot segment number, which takes values 0 to 5, represents occupancy information of the 30 time slots with a time slot bit table with 5 bits.

The Time slot bit table represents the data occupation condition of a time slot (2-30) with the time slot segment number. "1" expresses that the time slot is occupied by Ethernet data, "0" expresses that the time slot is occupied by the voice service.

According to above definitions, in each E1 frame (125 μs), it needs to express the condition of 30 time slots, but, in each E1 frame, time slot 1 can only express 8-bit information, so that it needs multiple E1 frames to express the entire time slots. A control word is made up of 3-bit time slot segment numbers and 5-bit time slot bit tables. 30 time slots are distributed in 6 time slot segments, and each time slot segment can describe the occupancy information of 5 time slots. To describe the service distribution condition of 30 time slots demands 6 frames (6×125 μs=1.5 ms), and serial numbers of the 6 frames are represented as the time slot segment numbers. Table 4 lists the time slot numbers expressed by control words in 6 frames.

TABLE 4

Control word configuration

| | Time slot bit table | | | | | Time slot segment number | | |
|---|---|---|---|---|---|---|---|---|
| Frame 1 | TS2 | TS3 | TS4 | TS5 | TS6 | 0 | 0 | 1 |
| Frame 2 | TS7 | TS8 | TS9 | TS10 | TS11 | 0 | 1 | 0 |
| Frame 3 | TS12 | TS13 | TS14 | TS15 | TS16 | 0 | 1 | 1 |
| Frame 4 | TS17 | TS18 | TS19 | TS20 | TS21 | 1 | 0 | 0 |
| Frame 5 | TS22 | TS23 | TS24 | TS25 | TS26 | 1 | 0 | 1 |
| Frame 6 | TS27 | TS28 | TS29 | TS30 | TS31 | 1 | 1 | 0 |

In the present invention, the work quantity of software is smaller. In E1/T1 link, in the direction of service demultiplexing, the demultiplexing service is completely implemented by hardware without participation of software. When the service is multiplexed in the direction of E1/T1 link (called the direction of demultiplexing), the CPU informs the time slot distribution circuit of the time slot numbers to be occupied by the voice service according to a voice call condition, and the time slot distribution circuit releases the time slots from Ethernet data at the latest 6 frames (1.5 ms) later, and assigns them to the voice service; after the voice call finishes, CPU informs the time slot distribution circuit that the circuit time slots have been released by the voice service, and the time slot distribution circuit assigns the time slots to the Ethernet data service at the latest 6 frames (1.5 ms) later, so as to realize a dynamic adjustment of the bandwidth of the Ethernet data service.

What is claimed is:

1. A method for realizing dynamic adjustment of data bandwidth in transmission equipment, comprising adding, by a device for realizing dynamic adjustment of data bandwidth in transmission equipment, a control channel in a trunk link of the transmission equipment for describing occupancy on time slots by a current service, and further comprising informing a time slot distribution circuit by CPU of time slots to be occupied by a voice service as voice call begins when the current service is multiplexed to a direction of E1/T1 link;

releasing the time slots from data service by the time slot distribution circuit, and distributing to the voice service;

informing the time slot distribution circuit by the CPU of the time slot having been released by the voice service after voice call finishes; and distributing the time slots to data service by the time slot distribution circuit, whereby dynamic adjustment of data service is implemented.

2. The method for realizing dynamic adjustment of data bandwidth in transmission equipment of claim 1, wherein the control channel implements dynamic distribution on time slots in PCM line under control of the CPU.

3. The method for realizing dynamic adjustment of data bandwidth in transmission equipment of claim 2, wherein the dynamic distribution on time slots is controlled by channel control words written in the control channel, and the control channel comprises one or more time slots.

4. The method for realizing dynamic adjustment of data bandwidth in transmission equipment of claim 1, wherein the current service comprises voice service and data service.

5. The method for realizing dynamic adjustment of data bandwidth in transmission equipment of claim 1, wherein the method is applied in peer networking.

6. The method for realizing dynamic adjustment of data bandwidth in transmission equipment of claim 1, wherein the device for realizing dynamic adjustment of data bandwidth in transmission equipment comprises: a control word process circuit, a time slot distribution circuit and a CPU interface circuit, the control word process circuit is designed to complete extraction and insertion of control information in the control channel of E1/T1 link; the time slot distribution circuit is designed to complete separating voice time slots from Ethernet data time slots, and rebuilding data; the CPU interface circuit implements controlling on time slot distribution.

7. A device for realizing dynamic adjustment of data bandwidth in transmission equipment, comprising: a control word process circuit, a time slot distribution circuit and a CPU interface circuit, wherein the control word process circuit is designed to complete extraction and insertion of control information describing occupancy on time slots by a current service in control channel of E1/T1 link; the time slot distribution circuit is designed to complete separating voice time slots from Ethernet data time slots, and rebuilding data; the CPU interface circuit implements controlling on time slot distribution and informing the time slot distribution circuit by the CPU of time slots to be occupied by a voice service as voice call begins.

8. The device for realizing dynamic adjustment of data bandwidth in transmission equipment of claim 7, wherein the device further comprises High Level Data Link Control (HDLC), Media Access Control (MAC) frame process circuit to implement processing HDLC link for Ethernet data, checking integrity of MAC frame, comparing and learning MAC addresses.

9. The device for realizing dynamic adjustment of data bandwidth in transmission equipment of claim 7, wherein the time slot distribution circuit is controlled by channel control words written in the control channel, and the control channel comprises one or more time slots.

* * * * *